Figure 4:
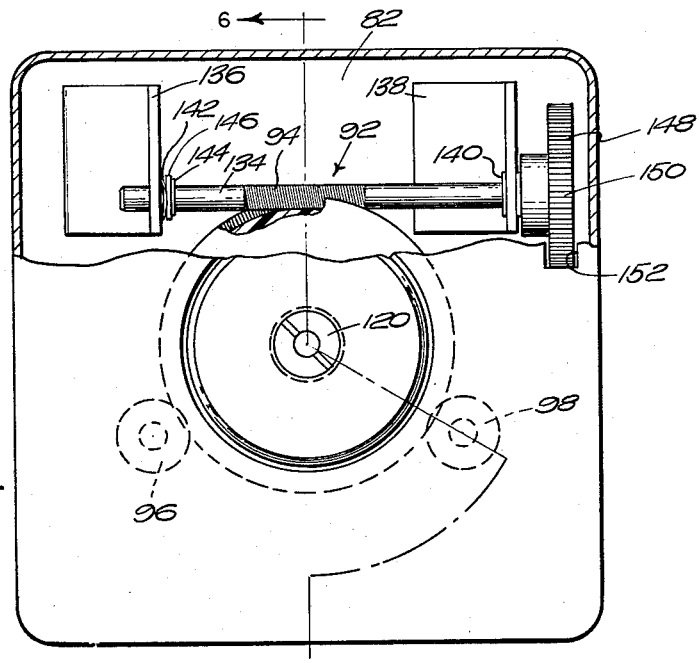

April 6, 1965                E. RICE ETAL                3,176,534
                           WORM AND WHEEL UNIT
Filed April 12, 1961                                 2 Sheets-Sheet 1
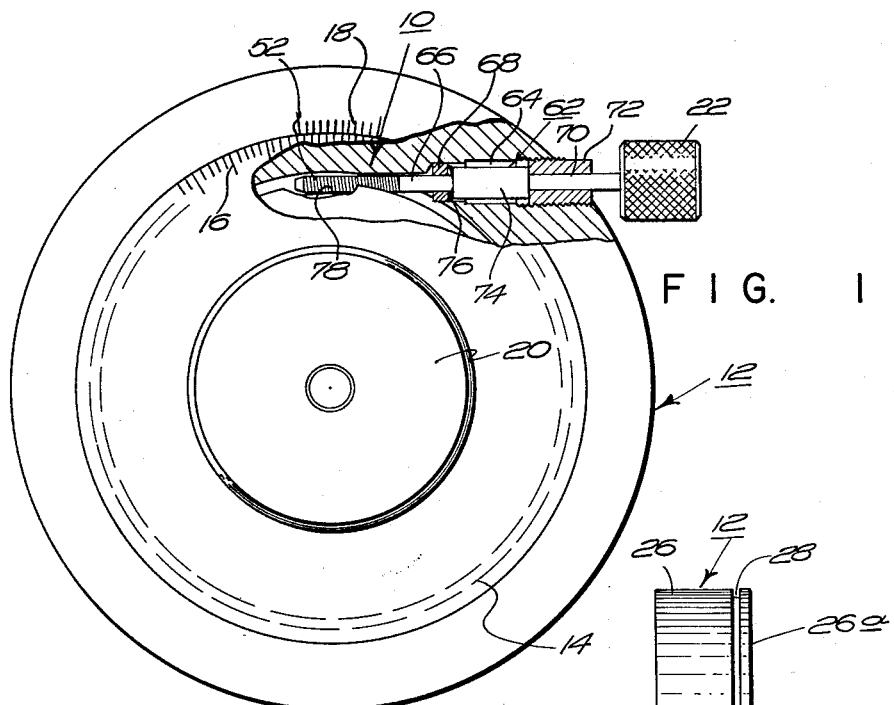
FIG. 1
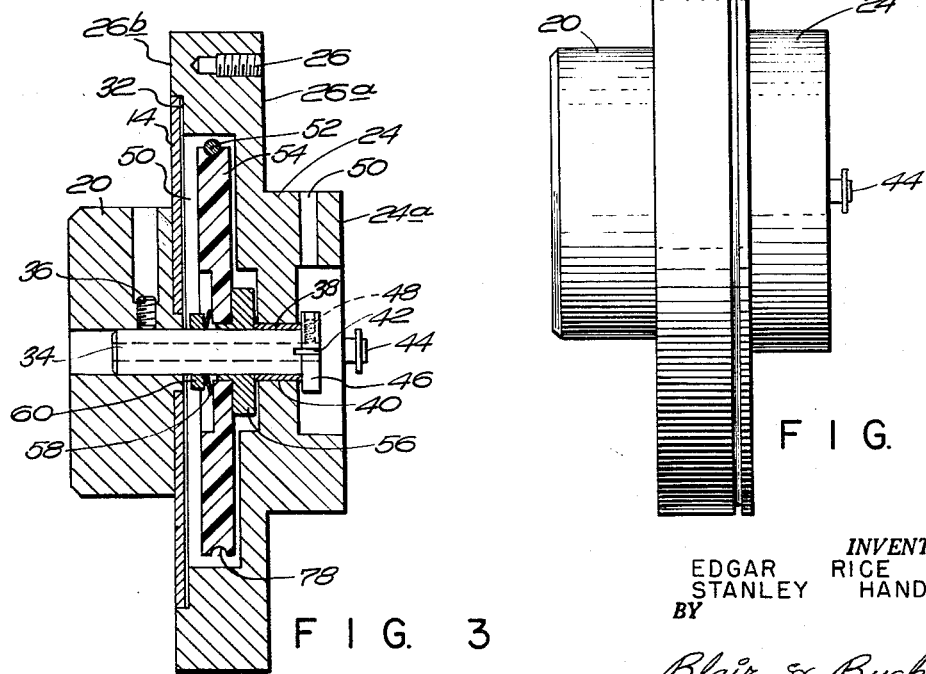
FIG. 2
FIG. 3
INVENTORS
EDGAR RICE
STANLEY HANDELMAN
BY
*Blair & Buckles*
ATTORNEYS April 6, 1965 E. RICE ETAL 3,176,534
WORM AND WHEEL UNIT
Filed April 12, 1961 2 Sheets-Sheet 2

INVENTORS
EDGAR RICE
STANLEY HANDELMAN
BY
Blair & Buckles
ATTORNEYS

United States Patent Office 3,176,534
Patented Apr. 6, 1965

3,176,534
WORM AND WHEEL UNIT
Edgar Rice, Wayne, and Stanley Handelman, Emerson, N.J., assignors to Theta Instrument Corporation, Saddle Brook, N.J.
Filed Apr. 12, 1961, Ser. No. 102,511
7 Claims. (Cl. 74—425)

This invention relates to a novel worm and wheel unit and to a dial assembly incorporating the unit. More particularly, it relates to a worm and wheel unit in which a metallic worm meshes with teeth embossed in a plastic wheel by rotation of the worm itself.

In certain types of apparatus controlled by hand, the angular position of a shaft must be set to within limits unobtainable by direct hand rotation of the shaft. For example, the shaft angles of tuning capacitors and synchros often must be set to within a few seconds of arc, a tolerance beyond the limits imposed by such factors as the unsteadiness of one's hand, friction, etc. Consequently, gear reduction units are often interposed between the hand and the shaft to be controlled by it.

Reduction ratios of the order of a thousand to one or better are often needed to provide the required improvement in resolution, and in prior gear reduction units at least two stages have generally been needed for an overall ratio of this magnitude. These units, which generally take the form of worm and wheel combinations, have been costly to fabricate, since they must be machined to exacting tolerances in order to provide evenness of motion. Furthermore, output backlash must be negligible for the controlled shaft to be completely controllable within close limits, and this requirement has resulted in relatively expensive anti-backlash provisions.

Accordingly, it is a principal object of our invention to provide an improved gear reduction unit having a high reduction ratio in a minimum number of stages.

A more specific object is to provide a worm and wheel unit capable of a reduction ratio of a thousand to one or better in a single stage.

Another object of our invention is to provide a gear reduction unit of the above type having a relatively small space requirement.

A further object of the invention is to provide a reduction unit of the above type characterized by evenness of output motion and relative freedom from backlash in the output thereof.

Yet another object of the invention is to provide a reduction unit of the above type which is relatively free from a wear problem usually associated with such units.

A still further object of the invention is to provide an efficient method for fabricating gear reduction units of the above type at relatively low cost.

Another object of our invention is to provide a dial assembly incorporating a gear reduction unit of the above type.

Other objects of the invention will in part be obvious and will in part appear hereinafter.

The invention accordingly comprises the several steps and the relation of one or more of such steps with respect to each of the others, and the features of construction, combinations of elements and arrangements of parts which are exemplified in the following detailed disclosure, and the scope of the invention will be indicated in the claims.

Figures 5, 6:
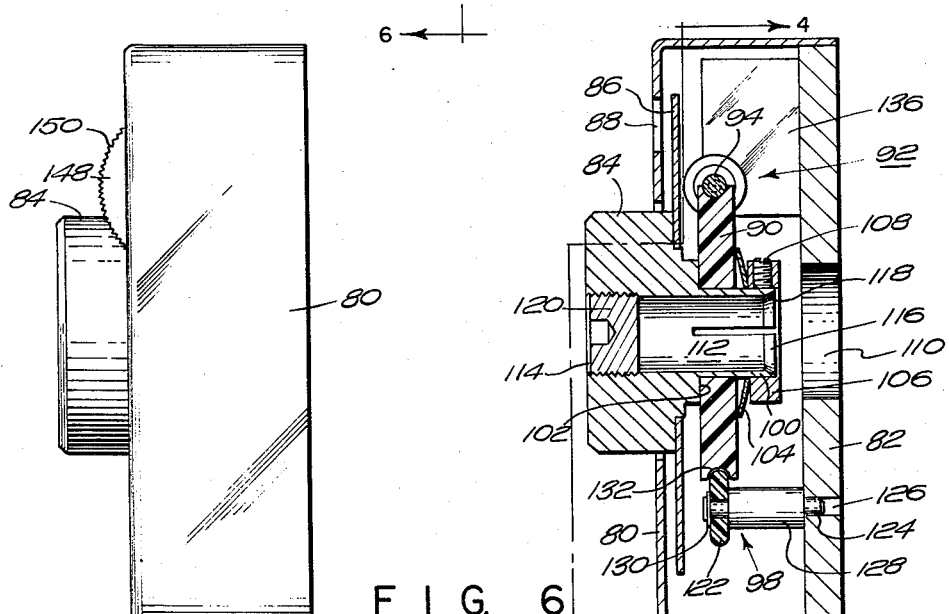

For a fuller understanding of the nature and objects of the invention, reference should be had to the following detailed description taken in connection with the accompanying drawings, in which:

FIGURE 1 is a front elevation, partly broken away, of a dial assembly incorporating the features of our invention, FIGURE 2 is an edge view of the dial assembly of FIGURE 1, FIGURE 3 is a section taken along line 3—3 of FIGURE 1, FIGURE 4 is a front view, partly broken away, of another dial assembly made according to our invention, FIGURE 5 is an edge view of the dial assembly of FIGURE 4, FIGURE 6 is a section taken along line 6—6 of FIGURE 4.

In general, a gear reduction unit made according to our invention has a metallic worm which meshes with teeth on a plastic wheel. By way of example, the thread on the worm may have a pitch of 144 turns per inch. Assuming a diameter of slightly greater than three inches for the wheel, i.e., a circumference of ten inches, the wheel will have 1440 teeth on its periphery, and the unit will have a reduction ratio of 1440.1. In other words, four complete turns of the worm are required for a one-degree rotation of the wheel.

Obviously, the formation of such a large number of teeth by conventional methods, e.g., hobbing and broaching, would be extremely expensive, and, when one considers the size of the wheel, the teeth are so closely spaced that use of these methods is wholly impractical. Another important factor is the variation within resonable tolerance limits of the pitch of the worm. In a conventional worm and wheel unit of this size and reduction ratio, this could prevent complete meshing of the worm thread with the wheel teeth, resulting in excessive wear. Furthermore, conventional anti-backlash techniques would be difficult to apply in such a worm and wheel unit.

We have overcome these problems by embossing the teeth on the wheel. That is, the teeth are formed by shifting material, rather than removing it in accordance with prior techniques. The embossing is accomplished by use of the worm itself, which is brought to bear against the wheel and then rotated. The worm thread impresses its image on the wheel, and rotation of the worm advances the wheel to apply this impression around the entire circumference thereof.

The worm is generally rotated sufficiently to provide at least two or three revolutions of the wheel in order to secure a deep imprint of the thread. This also eliminates any problems which might occur in cases where the wheel circumference does not correspond to an integral number of teeth prior to formation of the teeth thereon.

More specifically, with the dimensions given above, the worm teeth are spaced approximately 0.007 inch on center. Thus, through variations in the diameter of the wheel, its circumference might depart by as much as 0.0035 inch from the value required for an integral number of teeth. Assuming that such is the case, as the wheel completes one full revolution during the first pass over the worm, the worm thread will not exactly mesh with the teeth embossed at the beginning of the wheel rotation. The leading portions of the thread will be displaced somewhat from an exact meshing position, while the trailing portions of the thread will still mesh with the recently completed teeth. Further rotation of the worm causes the leading portions to re-emboss the teeth they engage, so as to shift them slightly and bring them into position. In other words, the material engaged by the thread is shifted somewhat to bring the teeth into alignment with the thread.

After the second rotation of the wheel, it may be found that there is still a discrepancy between the teeth and the worm. However, the error will be significantly less than on the first pass. Successive rotations will completely eliminate the discrepancy.

It will be apparent that the method by which the worm teeth are formed is much less costly than the various prior methods in which the teeth are actually cut, i.e., material is removed from the wheel. Also, in cases where an exactly predetermined reduction ratio is not required, the tolerances on the wheel blank may be relatively broad, since, as pointed out above, the wheel teeth can easily be formed regardless of the diameter.

An even more important advantage stems from the fact that there is an interfering fit between the worm thread and wheel teeth. The interference is due primarily to the fact that, during the embossing process, not all of the displacement of material on the wheel is due to plastic deformation. Part of the deformation is elastic, so that the surface of the wheel engaging the worm thread tends somewhat to return to its previously flat condition. In so doing, it tightly grips the individual turns of the worm thread in contact therewith, thus eliminating backlash in the unit. It should be noted that, even with the tight interference fit between the worm thread and wheel teeth, the friction between them is not too great. For example, in a unit using a steel worm and a nylon wheel, the worm can be rotated at high speed, e.g., 1750 r.p.m., to form the thread without developing an appreciable temperature rise.

Another advantage of the invention is the elimination of stripping of the thread or teeth when excess torque is applied to the wheel. In a unit having the above dimensions, the wheel teeth undergo a large elastic deformation on over-torque and move over the worm thread until the torque is reduced. Then they pop back into the thread grooves to once again mate with the thread for operation in the manner descirbed above.

The worm may be of any suitable material sufficiently stronger and harder than the plastic of the wheel. Most metals, particularly steel, fit this requirement, and we have found that stainless steel is particularly well adapted for use in the unit. The wheel should be of a plastic having a low coefficient of friction. Such plastics are generally characterized by a slippery tactile sensation, and among these are nylon, tetrafluorethylene and polytrifluorochloroethylene. We prefer to use nylon, because of its relatively high resistance to creeping under the force exerted on the wheel by the worm when the unit is at rest for long periods of time.

In FIGURES 1–3, we have illustrated the use of my worm and wheel unit in a dial assembly of a type often used to control the shaft angle of a synchro. As shown in FIGURE 1, a worm and wheel unit generally indicated at 10 is enclosed in a housing generally indicated at 12. A dial 14 on the front of the assembly has indicia 16 which are read in conjunction with vernier indicia 18 on the housing 12 adjacent to the dial. A knob 20 is fastened to the dial 14, and, as explained in detail below, the knob may be used for coarse adjustment of a synchro attached to the dial assembly, while a knob 22 on the worm and wheel unit 10 is used for fine adjustment.

As seen in FIGURE 2, the housing 12, which is cylindrical in shape, has a rearwardly extending projection 24, which normally extends through a panel (not shown) on which the dial assembly is mounted. The rear surface 26a of the enlarged portion 26 of the housing is flush against the panel, to which the dial assembly may be secured by means of clamps (not shown) secured to the panel and extending into a circumferential groove 28. Panel mounting may also be accomplished by means of screws extending through the panel and threaded into holes 30 (FIGURE 3) in the enlarged portion 26.

Turning to FIGURE 3, the dial 14 is disposed within a recess 32 in the housing 12, so that it is flush with the front surface 26b of the portion 26. The dial is suitably secured to the knob 20, e.g., by staking, and the knob, in turn, is fastened to a shaft 34 by means of a set screw 36. The shaft 34 is journalled in a sleeve bearing 38 press-fitted into a bore 40 in the housing 12. The shaft is hollow and slotted at its right end, as indicated at 42, to facilitate connection to the shaft of a synchro (not shown).

More particularly, the accurately machined front surface of the synchro is clamped against the rear surface 24a of the projection 24 by a plurality of conventional synchro clamps, one of which is shown at 44. The shaft of the synchro fits within the slotted portion of the shaft 34, and the surface 24a is accurately machined so as to be perpendicular to the axis of the shaft 34, thereby providing alignment of this axis with the axis of the synchro shaft. The synchro shaft is tightly clamped within the shaft 34 by means of a shaft retainer 46, having a plurality of set screws 48 accessible through a hole 50 in the projection 24. The retainer 46 also secures the shaft 34 against leftward axial movement (FIGURE 3).

The parts associated with the worm and wheel unit 10 are located generally within a cavity 50 in the housing 12. They include a worm 52 meshing with a wheel 54 coupled to the shaft 34 for rotation therewith.

More specifically, the wheel 54 is connected to the shaft 34 by means of a friction clutch assembly comprising a pressure hub 56, press-fitted on the shaft 34 for rotation therewith, a Belleville spring 58 and a shaft retainer 60 similar to the retainer 46. The spring 58, which acts between the retainer 60 and the wheel 54, urges the wheel against the hub 56, and the frictional force between the wheel and hub causes the hub and the shaft 34 to rotate with the wheel. With the wheel 54 kept from rotation by its engagement with the worm 52, slippage of the cltuch assembly permits rotation of the shaft 34 by means of the knob 20.

The position of the retainer 60 may be adjusted to vary the force exerted by the spring 58 against the wheel 54 and thereby regulate the torque required for slippage of the clutch. The slippage level should be sufficiently high to prevent slippage when the shaft 34 is to be rotated by the wheel 54 through rotation of the worm 52 and yet not so high as to require an excessive rotational force on the knob 20 when rotation of the shaft by means of this knob is desired.

Thus, coarse adjustment of the angular position of the shaft 34 and the synchro shaft coupled thereto is readily effected by means of the knob 20, and fine adjustment is accomplished by rotation of the worm 52 engaging the wheel 54. Preferably, the worm and wheel have the construction set forth above, providing a high reduction ratio between rotation of the worm and angular displacement of the shaft 34, together with the other stated advantages of the unit.

Returning to FIGURE 1, the worm 52 is an integral part of a shaft generally indicated at 62 disposed within an aperture 64 in the housing 12. The shaft includes a shank 66 journalled in a bearing 68 and a shank 70 extending through a bushing 72 threaded into the aperture 64. The shaft also has an enlarged portion 74 between the shanks 66 and 70, and a Belleville spring 76 pushing against the bearing 68 forces the portion 74 against the bushing 72 to eliminate end-play in the shaft. The knob 22 is suitably affixed to the shank 70.

As seen in FIGURES 1 and 3, the rim of the wheel 54 is preferably formed with a circumferentially extending semi-circular groove 78 in which the worm 52 is seated. The radius of curvature of the groove 78, before formation of the teeth on the wheel, is approximately equal to the root radius of the worm 52, i.e., the radius from the center of the worm to the root of the thread thereon. Thus, a substantial portion of the circumference of the worm 52, approximately one half, engages the wheel 54, thereby maximizing the torque which can be transmitted between the wheel and worm.

An efficient method of forming the teeth on the wheel 54 is to assemble the dial assembly with a blank wheel, forcing the shaft 62 into place with the worm 52 disposed in the groove 78 as shown. The shank 70 is then coupled to a motor which rotates the shaft and the worm 52 thereon to form the teeth in the manner described above.

In FIGURES 4, 5 and 6 we have illustrated a second dial assembly which is particularly adaptable for connection to shafts which cannot be accurately oriented with respect to the housing of the assembly. For example, the dial assembly may be used to advantage to control the shaft angle of a synchro whose housing is not accessible for use of the front surface thereof as a reference.

As best seen in FIGURE 6, the dial assembly is housed in a cup-shaped member 80, closed off by a plate 82. A knob 84, extending through the member 80, carries a dial 86 provided with indicia (not shown) which may be viewed through a window 88. The knob 84 is supported by the wheel 90 of a worm and wheel unit generally indicated at 92, and the wheel 90, in turn, is supported by the worm 94 of the unit 92, together with a pair of roller assemblies generally indicated at 96 and 98 (FIGURE 1).

More specifically, as shown in FIGURE 6, the knob 84 has an integral sleeve 100 extending through the central portion of the wheel 90. The wheel is forced against a shoulder 102 on the knob by a Belleville spring 104 acting between the wheel and a retainer 106, secured to the sleeve 100 by set screws 108. Thus, the shoulder 102, spring 104 and retainer 106 provide a slipping clutch action similar to that of FIGURE 3, and the position of the retainer 106 may be altered to adjust the torque at which there is slippage between the knob 94 and the wheel 90.

Still referring to FIGURE 6, a shaft (not shown) coupled to the dial assembly passes through an aperture 110 in the plate 82 and enters a collet 112. The collet 112 is disposed partly within the sleeve 100 and partly within a bore 114 extending the rest of the way through the knob 84. The collet has a beveled flange 116 which engages a similar bevel 118 on the sleeve 100. A screw 120, threaded into the bore 114 and rotatably attached to the collet 112, provides a shaft-gripping action for the collet 112.

More particularly, when the screw is rotated in the direction causing it to move to the left (FIGURE 6) with the collet 112, the camming action of the bevel 118 against the flange 116 closes the collet to grip a shaft disposed within it. Rotation of the screw 120 in the opposite direction serves to open the column and release the shaft. As shown in FIGURE 4, the screw 120 is readily accessible from the front of the end of the knob 84.

The roller assembly 98, which is similar to the assembly 96, has a roller 122, preferably of nylon, rotatably mounted on a pin 124, press-fitted into a hole 126 in the plate 82. The roller 122 is spaced from the plate 82 by a sleeve 128, and the pin 124 is swaged over against a washer 130 to hold the roller in place. Preferably, the radius of curvature of the rim of the roller 122 is somewhat less than that of the circumferential groove 132 in the wheel 90. Thus, the wheel 90 can be rocked back and forth slightly above the horizontal axis (FIGURE 4) so as to align the collet 12 with a shaft which would otherwise be slightly out of alignment therewith.

As seen in FIGURE 4, the worm 94 occupies the central portion of a shaft 134 journalled in a pair of angle plates 136 and 138. The plates 136 and 138 are suitably secured to the rear plate 82 of the dial assembly. A snap ring 140 on the shaft 134 is forced against the angle plate 138 by Belleville spring 142 acting between the angle plate 136 and a snap ring 144 by way of a washer 146. A knob 148, fastened to the shaft 134, has a knurled rim 150 extending through an aperture 152 in the front of the member 80. Thus, fine adjustment of the dial assembly may be accomplished by "thumbing" the rim 150 to rotate the knob 84 and collet 112 by means of the worm and wheel unit 92.

The worm and wheel unit 92 is similar to the unit 10 of FIGURE 1. Thus, the worm 94 is preferably of a hard metal such as steel, and the wheel 90 of a suitable plastic material such as nylon. The teeth on the wheel may be formed as described above by assembling the unit with a blank wheel 90, inserting the shaft 134 and rotating it to accomplish a few rotations of the wheel.

Thus, we have described an improved worm and wheel unit capable of a reduction of better than 1000 to 1 in a single stage of moderate size. The unit is characterized by absence of backlash, together with evenness of motion in its output. Yet it is relatively low in cost and simple to fabricate. We have also described dial assemblies incorporating the worm-wheel unit. These assemblies, which may be readily mounted on instrument panels for rotation of shafts connected to instruments behind the panels, provide for both coarse and fine adjustment of shaft angles. Coarse adjustment is effected by means of a knob directly connected to the controlled shaft and fine adjustment is effected by a worm and wheel unit of the above type coupled to the knob and shaft through a slipping clutch arrangement. The dial assemblies thus provide for quick yet accurate setting of a shaft angle, yet they are made of simple parts, easily fabricated to form assemblies having a relatively low cost compared to previous assemblies providing the same functions.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. A worm and wheel unit comprising, in combination, a worm of hard material having a thread surface thereon, means for supporting said worm for rotation about its axis, a wheel of plastically and elastically deformable material substantially softer than said worm, means for supporting said wheel for rotation about its axis and in forceful engagement with said worm, the rim of said wheel having embossed teeth thereon formed by said forceful engagement with said worm, whereby the rim is plastically and elastically deformed initially and thereafter has teeth resiliently meshing with the thread of said worm by reason of the circumferentially directed elasticity remaining in said plastic material after embossing.

2. A worm and wheel unit comprising, in combination, a metallic worm with a thread surface thereon, means for supporting said worm for rotation about its axis, a wheel of plastically and elastically deformable material, means for supporting said wheel for rotation about its axis and in forceful engagement with said worm, said worm being disposed tangent to said wheel and in engagement with a rim of said wheel, said rim having embossed teeth thereon formed by said forceful engagement with said worm, whereby the rim is plastically and elastically deformed initially and thereafter has teeth resiliently meshing with the thread of said worm by reason of the circumferentially directed elasticity of said plastic material.

3. The combination defined in claim 2 including a circumferentially extending groove in said rim, said groove having an arcuate cross section whose radius of curvature is slightly less than the radius of said worm.

4. The combination defined in claim 2 in which said wheel is of nylon.

5. A worm and a wheel unit comprising a base, a bearing mounted on said base, a worm rotatively supported in said bearing, said worm being constructed of a relatively hard material and having a threaded surface thereon, a wheel constructed of a plastically and elastically deformable material, means maintaining said worm in forceful engagement with a portion of said wheel, said worm thread being adapted upon rotation of said worm to plastically and elastically deform said wheel portion without removing material therefrom, thereby raising around said wheel a series of toothlike bosses, said bosses having sufficient residual elasticity to resiliently mesh with the portions of the groove in the worm thread in register therewith after one revolution of said wheel, said worm thread thereby being adapted to reemboss the parts of said wheel portions having bosses out of register with said groove after one revolution of said wheel.

6. The method of making a worm and wheel unit comprising the steps of fashioning a worm out of relatively hard material, mounting said worm for rotation about its axis, fashioning a wheel out of a relatively soft and plastically and elastically deformable material, rotatively mounting the wheel in juxtaposition with the worm with the worm thread being in compressive engagement engagement with the opposing portion of the wheel rim so that when said worm is rotated about its axis until the wheel completes one revolution the wheel material at the portions of the rim successively opposing the worm thread is plastically and elastically deformed, said material deformation creating all around the rim a series of toothlike bosses having sufficient residual elasticity to resiliently mesh with the portions of the groove in the worm thread in register therewith after one revolution of the wheel.

7. The method defined in claim 6 including the further step of continuing the rotation of the worm after the wheel has completed one revolution, thereby to reemboss those portions of the wheel rim having bosses out of register with the groove in the worm thread after one revolution of the wheel.

References Cited by the Examiner
UNITED STATES PATENTS

| | | | |
|---|---|---|---|
| 9,544 | 1/53 | Cook | 74—215 |
| 132,899 | 11/72 | Comly | 80—16.3 |
| 1,518,473 | 12/24 | Whaler | 74—10.54 |
| 1,577,714 | 3/26 | Hayden | 74—10.85 |
| 1,592,121 | 7/26 | Moore | 74—10.85 |
| 1,641,718 | 9/27 | Whitlock | 74—10.85 |
| 2,106,088 | 1/38 | De Tar | 74—10.85 |
| 2,116,113 | 5/38 | Goudet | 74—10.85 |
| 2,760,381 | 8/56 | Picles | 74—458 |
| 2,812,668 | 11/57 | Holt | 74—458 |
| 2,860,217 | 11/58 | Bourns | 74—443 |
| 2,873,340 | 2/59 | Bourns et al. | 74—443 |
| 2,876,496 | 3/59 | Murphy | 18—56 |
| 2,883,875 | 4/59 | Davidson. | |
| 2,932,992 | 4/60 | Larsh | 74—443 |
| 2,972,781 | 2/61 | Levy | 18—56 |
| 3,036,823 | 5/62 | Taylor | 308—203 |
| 3,043,169 | 7/62 | McCardell | 80—16.3 |
| 3,076,352 | 2/63 | Larsh | 74—443 |

FOREIGN PATENTS

| | | |
|---|---|---|
| 2,880 | 3/85 | Great Britain. |

BROUGHTON G. DURHAM, *Primary Examiner.*

DON A. WAITE, *Examiner.*